United States Patent
Namekawa et al.

(10) Patent No.: US 7,256,641 B2
(45) Date of Patent: Aug. 14, 2007

(54) SEMICONDUCTOR DEVICE INCLUDING A THREE OR MORE STAGE SEMICONDUCTOR CHARGE PUMP

(75) Inventors: Toshimasa Namekawa, Tokyo (JP); Hiroshi Ito, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 11/052,052

(22) Filed: Feb. 8, 2005

(65) Prior Publication Data
US 2006/0049866 A1 Mar. 9, 2006

(30) Foreign Application Priority Data
Sep. 8, 2004 (JP) ............................. 2004-261345

(51) Int. Cl.
*G05F 1/10* (2006.01)
(52) U.S. Cl. ...................................................... 327/536
(58) Field of Classification Search ................ 327/535, 327/536, 537
See application file for complete search history.

(56) References Cited
U.S. PATENT DOCUMENTS 6,356,469 B1 * 3/2002 Roohparvar et al. .......... 363/60
6,608,782 B2 * 8/2003 Hirano .................. 365/189.09
6,774,707 B1 * 8/2004 Smith et al. ................. 327/536
6,888,399 B2 * 5/2005 Nakagawa et al. ......... 327/536

OTHER PUBLICATIONS

John F. Dickson, "On-Chip High-Voltage Generation in MNOS Integrated Circuits Using an Improved Voltage Multiplier Technique", IEEE Journal Of Solid-State Circuits, vol. SC-11, No. 3., Jun. 1976, pp. 374-378.
Toru Tanzawa, et al., "A Dynamic Analysis of the Dickson Charge Pump Circuit", IEEE Journal Of Solid-State Circuits, vol. 32, No. 8, Aug. 1997, pp. 1231-1240.
U.S. Appl. No. 11/360,670, filed Feb. 24, 2006, Ito.

* cited by examiner

*Primary Examiner*—Jeffrey Zweizig
(74) *Attorney, Agent, or Firm*—Oblon, Spivak, McClelland, Maier & Neustadt, P.C.

(57) ABSTRACT

A semiconductor device includes a three or more-stage semiconductor charge pump. The capacitance of a pumping capacitor that increases and decreases the potential of a final-stage node on the output side is larger than that of a pumping capacitor that increases and decreases the potential of another-stage node.

17 Claims, 8 Drawing Sheets

SEMICONDUCTOR DEVICE INCLUDING A THREE OR MORE STAGE SEMICONDUCTOR CHARGE PUMP

CROSS-REFERENCE TO RELATED APPLICATIONS

This application is based upon and claims the benefit of priority from prior Japanese Patent Application No. 2004-261345, filed Sep. 8, 2004, the entire contents of which are incorporated herein by reference.

BACKGROUND OF THE INVENTION

1. Field of the Invention

The present invention relates to a semiconductor device. More specifically, the invention relates to a multistage Dickson charge pump.

2. Description of the Related Art

Recently, the decrease in the voltage applied to a gate oxide film has strongly been demanded as the gate oxide film has been thinned in accordance with a decrease in device size. Because of this demand, the logic gate power supply voltage suddenly lowers. For example, a power supply voltage of 2.5V has been used in the 0.25 µm gate length generation complementary metal oxide semiconductor (CMOS), whereas a power supply voltage of 1.2V has been used in the 70 µm gate length generation CMOS.

There is a circuit block that requires a negative voltage or a voltage higher than the logic gate power supply voltage, such as a word-line boost power supply of a dynamic random access memory (DRAM), a write power supply of an electrically erasable programmable read only memory (EEPROM), a write power supply of an anti-fuse, and a back gate power supply of a vacuum treatment (VT)-CMOS. This circuit block utilizes characteristics that are hard to benefit from the effect of device shrinkage, such as cutoff characteristics of transistors, band gap characteristics of semiconductors, and back gate characteristics thereof. The decrease in power supply voltage does not therefore advance unlike the logic gate power supply voltage described above. For example, the voltage of the word-line boost power supply voltage is 3.5V in the 0.25 µm generation DRAM, whereas it is 3.0V in the 90 nm generation DRAM. The write power supply voltage of the EEPROM is as constant as approximately 10.0V. The back gate power supply of the VT-CMOS requires a negative voltage of −1.0V or lower and a voltage that is obtained by boosting the logic gate power supply voltage by 1.0V or higher in order to benefit from the effect of an adequate reduction in cutoff current.

To achieve a high-voltage (boost-voltage) power supply or a negative-voltage power supply, a boost power supply circuit is mounted in an integrated circuit. Usually, a charge pump, which does not require any inductor that makes it difficult to save space, is often used as the boost power supply circuit mounted in the integrated circuit. The voltage of the logic gate power supply decreases and so does the supply power voltage, whereas the acquired output voltage does not decrease. The output voltage, which is twice or more as high as the supply power voltage, is often demanded. A Dickson charge pump is effective in this demand (see, for example, J. F. Dickson, "On-Chip High-Voltage Generation in NMOS Integrated Circuits Using an Improved Voltage Multiplier Technique," IEEE J. Solid-State Circuits, June, 1976, Vol. SC-11, PP. 374-378).

As a difference between the supply power voltage and the output voltage becomes wide, the stage of a charge pump increases in number. However, the Dickson charge pump has the problem that its efficiency decreases as its stage increases (the output current decreases and the current consumption of a power supply circuit increases) (see, for example, Toru Tanzawa and Tomoharu Tanaka, "A Dynamic Analysis of the Dickson Charge Pump Circuit," IEEE Journal of Solid-State Circuits, August, 1997, Vol. 32, No. 8, PP. 1231-1240). When an extremely high output voltage of, e.g., 10.0V is required like the voltage of the write power supply of the EEPROM and that of the write power supply of the anti-fuse, the withstand voltage of a device that configures a boost power supply circuit, especially a pumping capacitor having a large device area causes a problem.

FIG. 8 shows a configuration of a prior art Dickson charge pump. This charge pump has a four-stage configuration to allow an output voltage (boost voltage) of about 6.0V to be generated upon receipt of a supply power voltage of 2.5V.

In the prior art Dickson charge pump, five diode elements 115a to 115e are connected in series between a high-potential power supply (external power supply) 111 and an output power supply (terminal) 113. These diode elements 115a to 115e are arranged in the forward direction. One electrode of each of pumping capacitors 117a to 117d is connected to its corresponding node between a cathode terminal of one of the diode elements 115a to 115e and an anode terminal of another one of the diode elements. The pumping capacitors 117a to 117d are of the same size (capacitance c). A first clock signal Φ1 is applied to the other electrode of each of the pumping capacitors 117b and 117d, while a second clock signal Φ2 is applied to the other electrode of each of the pumping capacitors 117a and 117c. The first clock signal Φ1 is generated by a CMOS inverter circuit 119a that receives a square clock signal Φ, and the second clock signal Φ2 is generated by a CMOS inverter circuit 119b that receives the first clock signal Φ1. On the other hand, two capacitors 123a and 123b are connected in two stages (in series) between the output power supply 113 and a ground potential 121. The external power supply 111 is connected to a node between the capacitors 123a and 123b.

FIGS. 9A to 9D illustrate an operation of the charge pump shown in FIG. 8. In order to describe the charge pump in simple language, the five diode elements 115a to 115e are compared to lock gates, and the supply power voltage of the external power supply 111, the intermediate nodes of the diode elements 115a to 115e, and the potential (output voltage) of the output power supply 113 are compared to the water levels of lock chambers partitioned by the lock gates.

FIG. 9A shows step 1 in which a first lock gate 115a' corresponding to the first diode element 115a connected to the external power supply 111 is open. The water level of a first lock chamber 116a partitioned by the first lock gate 115a' and a second lock gate 115b' corresponding to the second diode element 115b becomes equal to the level of the supply power voltage (2.5V) of the external power supply 111. A third lock gate 115c' corresponding to the third diode element 115c is also open, and the water levels of second and third lock chambers 116b and 116c are equal to each other. These water levels correspond to the intermediate potential (4.25V) between the supply power voltage (2.5V) of the external power supply and the potential (6.0V) of the output power supply 113 such that they can be imagined easily. A fifth lock gate 115e' corresponding to the fifth (final-stage) diode element 115e connected to the output power supply 113 is open. The water level of a fourth lock chamber 116d partitioned by the fifth lock gate 115e' and a fourth lock gate 115*d'* corresponding to the fourth diode element 115*d* becomes equal to the level of the potential (6.0V) of the output power supply 113.

The water bottom of the second lock chamber 116*b* and that of the fourth lock chamber 116*d* are raised. This means that the potential of the first clock signal (D shown in FIG. 8 is 2.5V. The heights from the water bottoms of the lock chambers 116*a* to 116*d* to the water surfaces thereof correspond to their respective voltages applied to the pumping capacitors 117*a* to 117*d* shown in FIG. 8. More specifically, in the operating state of step 1, a voltage of 2.5V, a voltage of 1.75V, a voltage of 4.25V, and a voltage of 3.5V are applied to the first, second, third, and fourth pumping capacitors 117*a*, 117*b*, 117*c*, and 117*d*, respectively.

FIG. 9B shows step 2 that indicates the moment when the potential of the first clock signal $\Phi 1$ becomes 0V and that of the second clock signal $\Phi 2$ becomes 2.5V. For easy understanding, FIG. 9B shows a water level of each of the lock chambers 116*a* to 116*d* when all the lock gates 115*a'* to 115*e'* corresponding to the five diode elements 115*a* to 115*e* are closed and all the lock chambers 116*a* to 116*d* are isolated from one another. Since the charge pump shown in FIG. 8 is configured by the diode elements 115*a* to 115*e* of passive elements, the state of step 2 shifts to that of step 3 shortly.

FIG. 9C shows step 3 in which the potentials of the first and second clock signals $\Phi 1$ and $\Phi 2$ are stabilized after an adequate time elapses after the potential of the first clock signal $\Phi 1$ becomes 0V and that of the second clock signal $\Phi 2$ becomes 2.5V. The fourth lock gate 115*d'* opens, and the water levels of the third and fourth lock chambers 116*c* and 116*d* become equal to each other (5.13V). The second lock gate 115*b'* opens; and the water levels of the first and second lock chambers 116*a* and 116*b* become equal to each other (3.38V). The highest voltage of 5.13V is applied to the fourth lock chamber 116*d*, or the fourth pumping capacitor 117*d*.

FIG. 9D shows step 4 in which the potential of the first clock signal $\Phi 1$ becomes 2.5V and that of the second clock signal $\Phi 2$ becomes 0V. These potentials are stabilized again in the state of step 1.

Recent integrated circuits may utilize the technology to form two different transistors that differ in thickness of oxide film on a single chip. For example, a logic gate (not shown) is configured by a transistor of a thin oxide film and its power supply voltage is decreased to about 1.2V. On the other hand, a memory device such as a DRAM and an EEPROM and an analog circuit or an input/output (I/O) circuit is configured by a transistor having a thick oxide film. The withstand voltage generated from the latter transistor is at most 2.5V to 3.3V. If a high voltage of 6.0V is directly applied to a gate oxide film, the gate oxide film is likely to be broken. To avoid this, the capacitors 123*a* and 123*b* are connected in series to the output power supply 113 as shown in FIG. 8.

The above capacitor 123*a* is a decoupling capacitor provided as an output load between power supplies. A decoupling capacitor is usually provided between the output power supply 113 and the ground potential 121. However, the capacitor 123*a* is provided between the output power supply 113 and the external power supply 111. The decoupling capacitor is generally configured by a MOS capacitor. With this configuration, the with-stand voltage of 6.0V or higher, which is originally required by the gate oxide film, can be decreased to 3.5V(=6.0V–2.5V).

The capacitor (decoupling capacitor) 123*b* is provided between the external power supply 111 and the ground potential 121. The output power supply 113 can tightly be coupled to the ground potential 121 through the capacitors 123*a* and 123*b*. Consequently, the noise of the output voltage is reduced and the potential is stabilized.

If the capacitor 123*b* between the external power supply 111 and the ground potential 121 is configured by a MOS capacitor and mounted in an integrated circuit, its coupling strength will be reduced by more than half as compared with the capacitor 123*a* that is directly connected to the ground potential 121. In most cases, however, the capacitance of the capacitor 123*b* can be compensated with an external capacitor or the parasitic capacitance of another circuit mounted in the integrated circuit. Thus, the problems that noise becomes extremely high and the area for the decoupling capacitor increases do not occur.

When the charge pump shown in FIG. 8 is so controlled that the external supply voltage is 2.5V and the output voltage is 6.0V, the highest voltage of 5.13V is applied to the final-stage pumping capacitor 117*d*. When the pumping capacitor is configured by a MOS capacitor, the voltage applied to the gate oxide film needs to be lowered. To do this, the final-stage pumping capacitor 117*d* can be configured by two MOS capacitors (capacitance c) 117$d_{-1}$ and 117$d_{-2}$ which are connected in series, as shown in FIG. 10.

However, the voltage at both ends of the pumping capacitor 117*d* increases and decreases in response to the first clock signal $\Phi 1$. It is thus difficult to compensate for the voltage of an intermediate node between the two MOS capacitors 117$d_{-1}$ and 117$d_{-2}$ that are connected in series. In other words, the intermediate node does not have an intermediate potential due to the influence of leakage current and parasitic capacitance and thus the effect of a decrease in the voltage applied to the gate oxide film cannot be expected. The series-connection of the MOS capacitors reduces the effective capacitance of the pumping capacitor 117*d* by half. Accordingly, the capability of current supply of the charge pump lowers. To compensate for this, a MOS capacitor whose area is doubled is needed. This increases not only the layout area but also the power consumption as the parasitic capacitance becomes larger.

When the final-stage pumping capacitor to which the highest voltage is applied is configured by the MOS capacitors as described above, the voltage applied to the gate oxide film needs to be lowered. A search has been made for an effective method for lowering the voltage.

BRIEF SUMMARY OF THE INVENTION

According to a first aspect of the present invention, there is provided a semiconductor device comprising a three or more-stage semiconductor charge pump, wherein capacitance of a pumping capacitor that increases and decreases a potential of a final-stage node on an output side is larger than that of a pumping capacitor that increases and decreases a potential of another-stage node.

DETAILED DESCRIPTION OF THE INVENTION

Embodiments of the present invention will be described below with reference to the accompanying drawings.

FIRST EMBODIMENT

Figure 1:
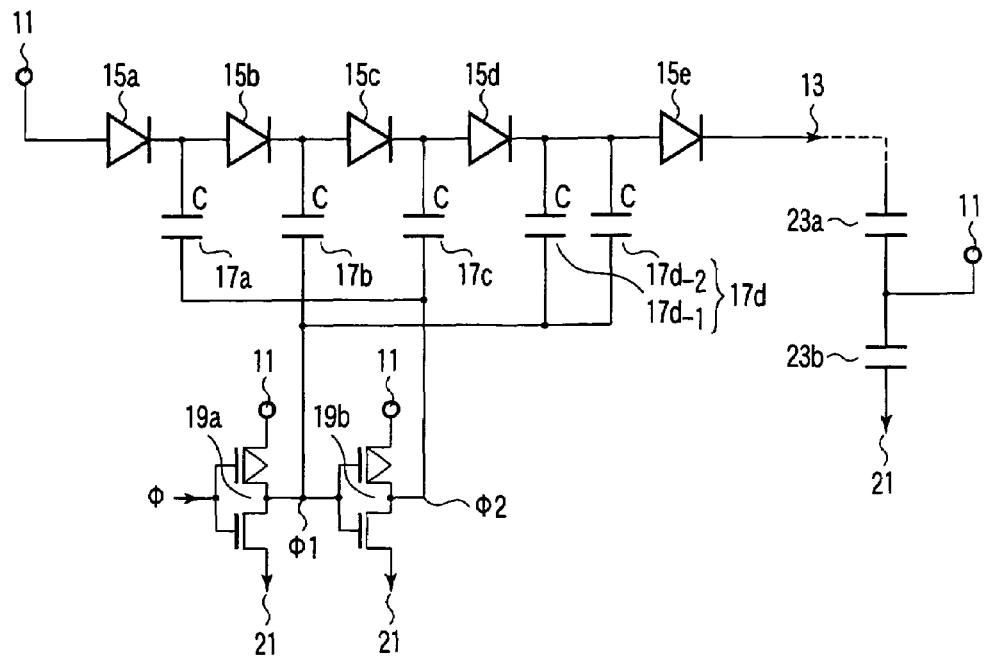
FIG. 1 is a circuit diagram of a Dickson charge pump power supply circuit according to a first embodiment of the present invention.

FIG. 1 shows a basic configuration of a multistage (semiconductor) charge pump according to a first embodiment of the present invention. The first embodiment is directed to a four-stage Dickson charge pump as an example of the multistage charge pump. The Dickson charge pump is configured to generate an output voltage (boost voltage) of about 6.0V upon receipt of a first power supply voltage of 0V and a second power supply voltage of about 2.5V.

First to fifth diode elements $15a$ to $15e$ are connected in series to a high-potential power supply (hereinafter referred to as an external power supply) 11 of the second power supply voltage. The anode terminal (second terminal) of the first diode element $15a$ in the odd-numbered stage is connected to the external power supply 11. The cathode terminal (first terminal) of the first diode element $15a$ is connected to the anode terminal of the second diode element $15b$ in the even-numbered stage. The cathode terminal of the second diode element $15b$ is connected to the anode terminal of the third diode element $15c$ in the odd-numbered stage. The cathode terminal of the third diode element $15c$ is connected to the anode terminal of the fourth diode element $15d$ in the even-numbered stage. The cathode terminal of the fourth diode terminal $15d$ is connected to the anode terminal of the fifth (final-stage) diode element $15e$ in the odd-numbered stage. The cathode terminal of the fifth diode element $15e$ is connected to an output power supply (terminal) 13.

One electrode of a first pumping capacitor (at least one pumping capacitor) $17a$ is connected to the cathode terminal of the first diode element $15a$ and the anode terminal of the second diode element $15b$. One electrode of a second pumping capacitor (at least one pumping capacitor) $17b$ is connected to the cathode terminal of the second diode element $15b$ and the anode terminal of the third diode element $15c$. One electrode of a third pumping capacitor (at least one pumping capacitor) $17c$ is connected to the cathode terminal of the third diode element $15c$ and the anode terminal of the fourth diode element $15d$. One electrode of a fourth (final-stage) pumping capacitor (at least one pumping capacitor) $17d$ is connected to the cathode terminal of the fourth diode element $15d$ and the anode terminal of the fifth diode element $15e$.

In the first embodiment, the fourth pumping capacitor $17d$ is configured by two MOS capacitors $17d_{-1}$ and $17d_{-2}$ connected in parallel. The size (capacitance c) of each of the MOS capacitors $17d_{-1}$ and $17d_{-2}$ is equal to that of each of the pumping capacitors $17a$, $17b$ and $17c$. In other words, the fourth pumping capacitor $17d$ has twice as large capacitance ($2c$) as each of the first to third pumping capacitors $17a$ to $17c$ that are formed of MOS capacitors.

A first clock signal $\Phi1$ is applied to the other electrode of each of the pumping capacitors $17b$ and $17d$, while a second clock signal $\Phi2$ is applied to the other electrode of each of the pumping capacitors $17a$ and $17c$. The first clock signal $\Phi1$ is generated by a CMOS inverter circuit (first output circuit) $19a$ that receives a square clock signal $\Phi1$, and the second clock signal $\Phi2$ is generated by a CMOS inverter circuit (second output circuit) $19b$ that receives the first clock signal $\Phi1$. In other words, the first and second clock signals $\Phi1$ and $\Phi2$ are generated from the square clock signal $\Phi$, as two-phase clock signals whose phases are 180° shifted from each other.

The square clock signal $\Phi$ has a potential between a low-potential power supply (hereinafter referred to as a ground) 21 of the first power supply voltage and the external power supply 11 described above. The square clock signal $\Phi$ is oscillated by a control circuit (not shown) when the potential of the output power supply 13 is lower than a set value (6.0V in this case) and fixed at a high or low potential when it is higher than the set value. In the first embodiment, the potential of the ground 21 is 0V and that of the external power supply 11 is 2.5V.

Load capacitors $23a$ and $23b$ are connected in series (two stages) to the output power supply 13. For example, one electrode of the load capacitor $23a$ is connected to the output power supply 13, while the other electrode of the load capacitor $23a$ is connected to the external power supply 11 and one electrode of the load capacitor $23b$. The other electrode of the load capacitor $23b$ is connected to the ground 21. The load capacitors $23a$ and $23b$ can reduce noise caused by an operation of the charge pump and decrease a ripple caused by the delay of a voltage control circuit (not shown). These load capacitors are not essential because the capacitor of a circuit connected to the output power supply 13 or a decoupling capacitor connected to the outside of an integrated circuit plays the same role.

FIGS. 2A to 2D illustrate operations of the above Dickson charge pump power supply circuit. To describe the operations in simple language, the five diode elements $15a$ to $15e$ are compared to lock gates, and the supply power voltage of the external power supply 11, the intermediate nodes of the diode elements $15a$ to $15e$, and the potential (output voltage) of the output power supply 13 are compared to the water levels of lock chambers partitioned by the lock gates.

Figure 2A:
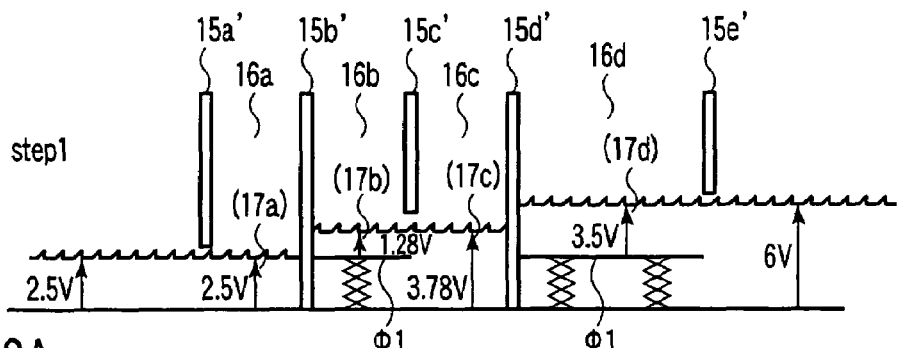
FIGS. 2A to 2D are illustrations of operations of the charge pump power supply circuit shown in FIG. 1.

FIG. 2A shows step 1 in which a first lock gate $15a'$ corresponding to the first diode element $15a$ connected to the external power supply 11 is open. The water level of a first lock chamber $16a$ partitioned by the first lock gate $15a'$ and a second lock gate $15b'$ corresponding to the second diode element $15b$ becomes equal to the level of the supply power voltage (2.5V) of the external power supply 11. A third lock gate $15c'$ corresponding to the third diode element $15c$ is also open, and the water levels of second and third lock chambers $16b$ and $16c$ are equal to each other. These water levels can be determined as 3.78V by simple calculation. A fifth lock gate $15e'$ corresponding to the fifth (final-stage) diode element 15e connected to the output power supply 13 is open. The water level of a fourth lock chamber 16d partitioned by the fifth lock gate 15e' and a fourth lock gate 15d' corresponding to the fourth diode element 15d becomes equal to the level of the potential (6.0V) of the output power supply 13.

The water bottom of the second lock chamber 16b and that of the fourth lock chamber 16d are raised. This means that the potential of the first clock signal Φ1 shown in FIG. 1 is 2.5V (the potential of the second clock signal Φ2 is 0V). The heights from the water bottoms of the lock chambers 16a to 16d to the water surfaces thereof correspond to their respective voltages applied to the pumping capacitors 17a to 17d shown in FIG. 1. More specifically, in the operating state of step 1, a voltage of 2.5V, a voltage of 1.28V, a voltage of 3.78V, and a voltage of 3.5V are applied to the first, second, third, and fourth pumping capacitors 17a, 17b, 17c, and 17d, respectively.

Figure 2B:
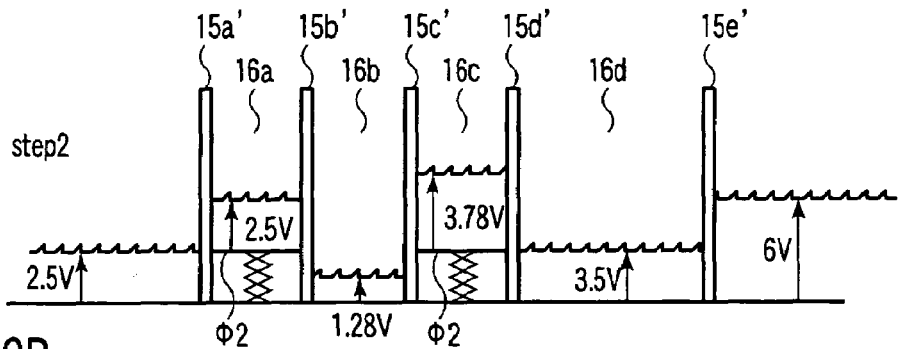

FIG. 2B shows step 2 that indicates the moment when the potential of the first clock signal Φ1 becomes 0V and that of the second clock signal Φ2 becomes 2.5V. For easy understanding, FIG. 2B shows a water level of each of the lock chambers 16a to 16d when all the lock gates 15a' to 15e' corresponding to the five diode elements 15a to 15e are closed and all the lock chambers 16a to 16d are isolated from one another. Since the charge pump shown in FIG. 1 is configured by the diode elements 15a to 15e of passive elements, the state of step 2 shifts to that of step 3 shortly.

Figure 2C:
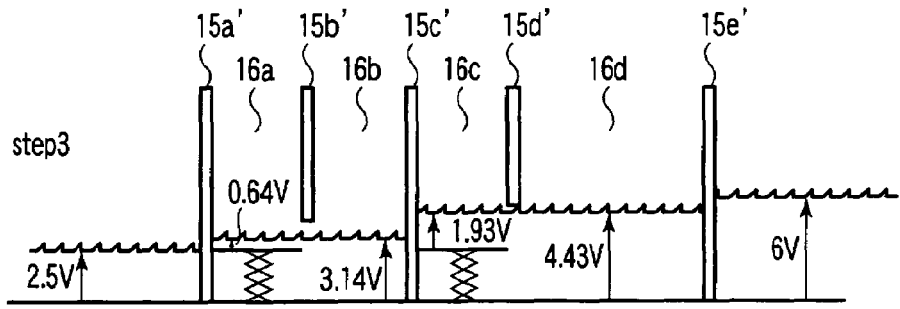

FIG. 2C shows step 3 in which the potentials of the first and second clock signals Φ1 and Φ2 are stabilized after an adequate time elapses after the potential of the first clock signal Φ1 becomes 0V and that of the second clock signal Φ2 becomes 2.5V. The fourth lock gate 15d' opens, and the water levels of the third and fourth lock chambers 16c and 16d become equal to each other (4.43V). The second lock gate 15b' opens, and the water levels of the first and second lock chambers 16a and 16b become equal to each other (3.14V). The highest voltage of 4.43V is applied to the fourth lock chamber 16d, or the fourth pumping capacitor 17d.

Figure 2D:
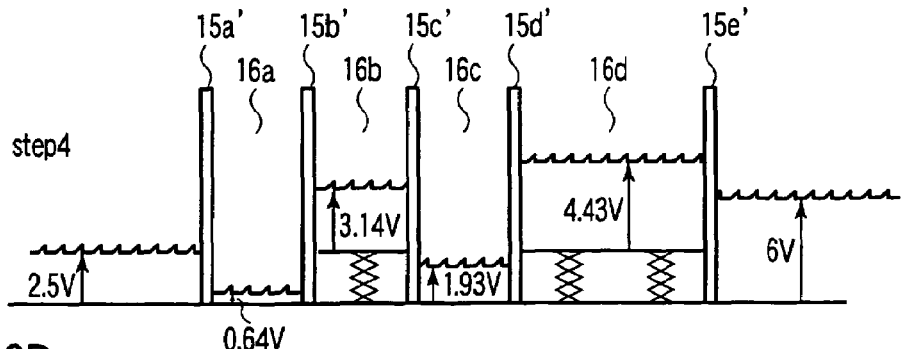

FIG. 2D shows step 4 in which the potential of the first clock signal Φ1 becomes 2.5V and that of the second clock signal Φ2 becomes 0V. These potentials are stabilized again in the state of step 1.

Figure 9A:
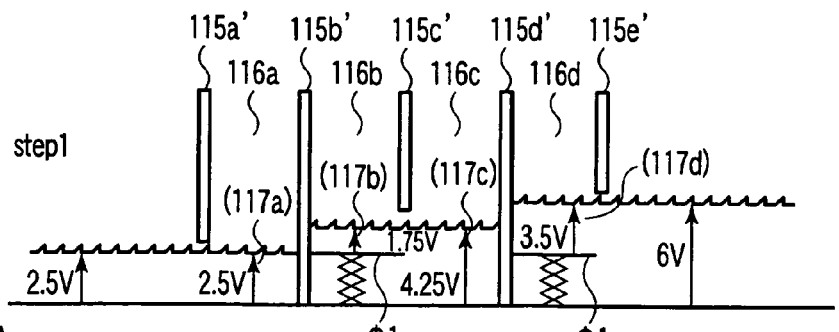
FIGS. 9A to 9D are illustrations of operations of the charge pump shown in FIG. 8.
Figure 9B:
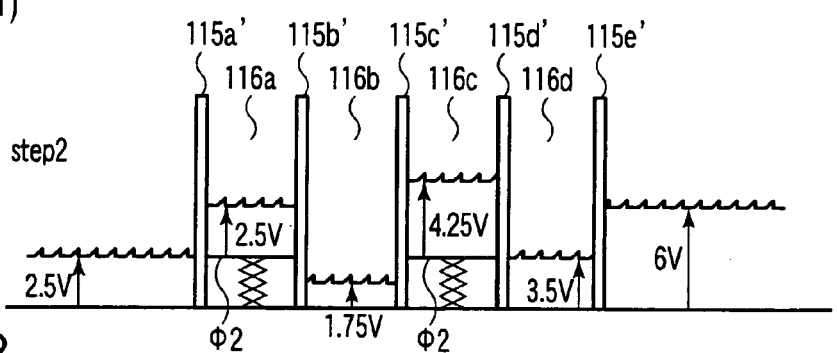
Figure 9C:
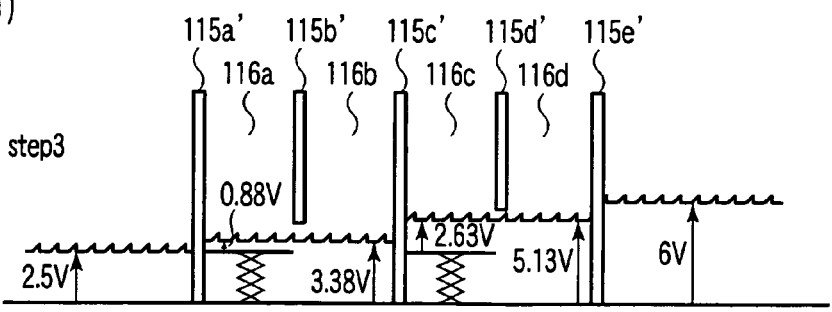
Figure 9D:
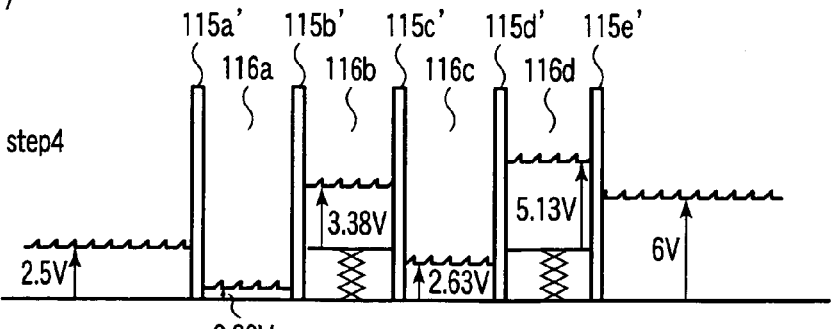

In the first embodiment, the fourth lock chamber 16d is twice as large as each of the other lock chambers 16a to 16c, or the capacitance of the fourth pumping capacitor 17d is twice as large as that of each of the other pumping capacitors 17a to 17c, as illustrated in FIGS. 2A to 2D. The water level of the fourth lock chamber 16d can be lowered to 4.43V, whereas that of the fourth lock chamber 116d in the prior art charge pump is 5.13V (see FIG. 9C, for example). Consequently, the highest voltage (greatest electric field) applied to the final-stage pumping capacitor 17d can be decreased by 0.7V.

The highest voltage applied to the final-stage pumping capacitor 17d can be decreased further if the capacitance of the pumping capacitor 17d is made more than twice as large as that of each of the other pumping capacitors 17a to 17c. If the capacitance is tripled, the highest voltage applied to the pumping capacitor 17d is 4.15V. If it is quadrupled, the highest voltage is 4.0V. However, the effect of a decrease in the voltage applied to the pumping capacitor 17d is a tradeoff between the amount of decrease in voltage and the amount of increase in area. It is thus appropriate that the capacitance of the pumping capacitor 17d be two to four times as large as that of each of the pumping capacitors 17a to 17c.

Figure 8:
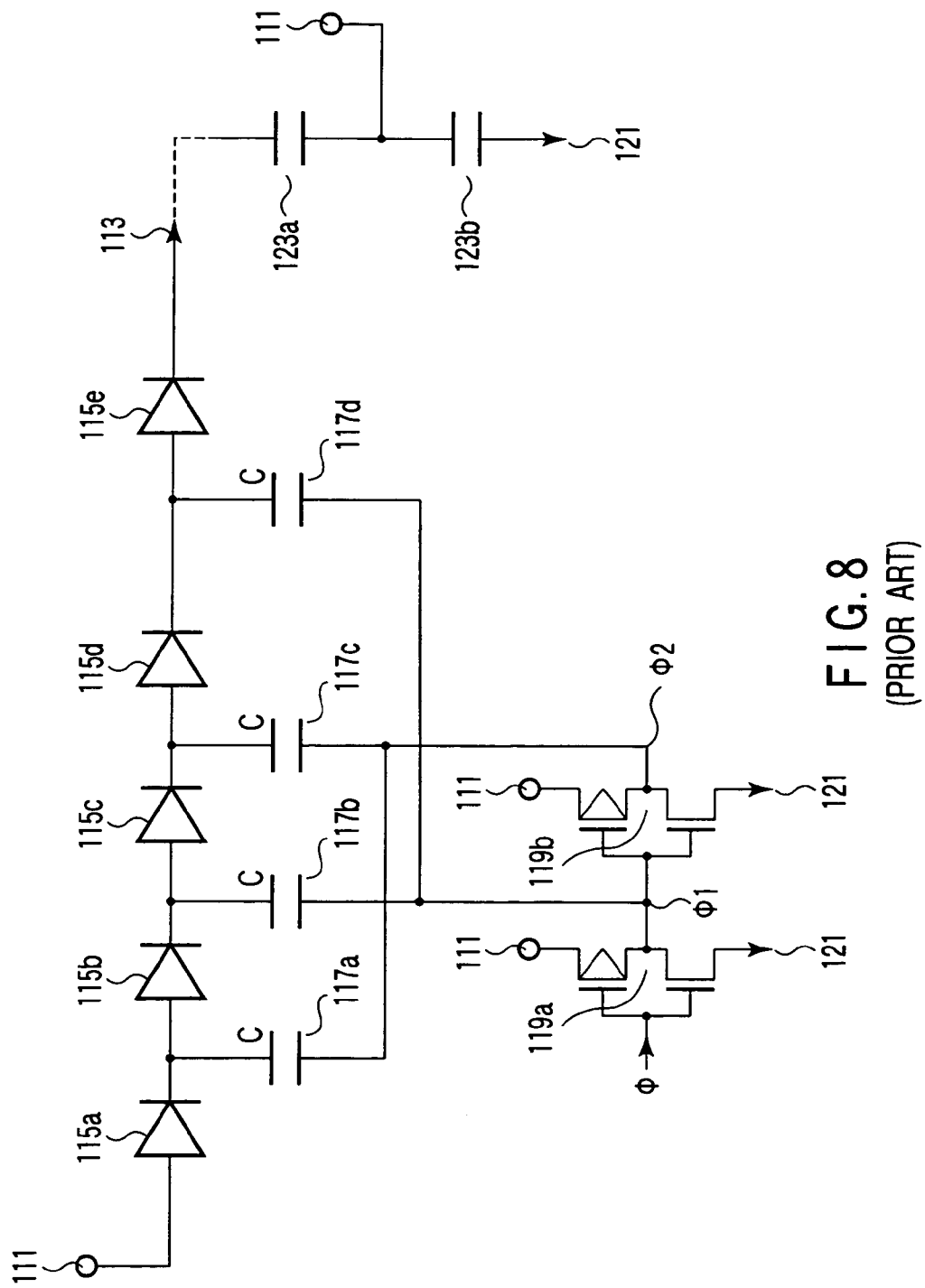
FIG. 8 is a circuit diagram showing a prior art Dickson charge pump and illustrating its problems.
Figure 10:
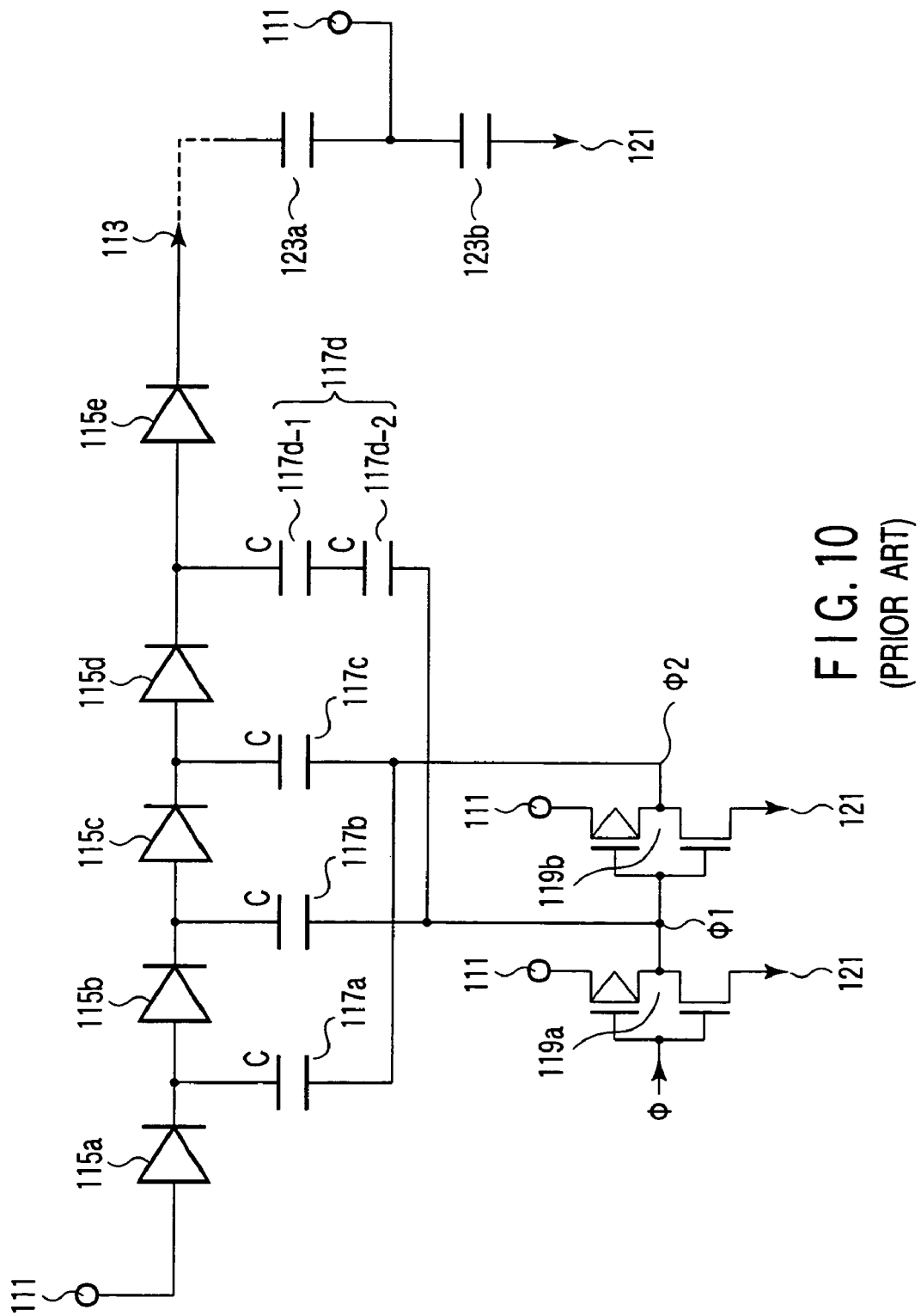
FIG. 10 is another circuit diagram of the prior art Dickson charge pump.

The advantage of the first embodiment is that the capability of current supply can be enhanced. If the capacitance of the final-stage pumping capacitor 17d is made twice as large as that of each of the other pumping capacitors 17a to 17c, the capability of current supply improves 14% as compared with that of the prior art charge pump (see FIG. 8). If the capacitance is tripled, the capability increases 20%. If quadrupled, it increases 23%. The effect of the improvement in the capability of current supply in the first embodiment is great, whereas the capability of current supply decreases 20% in the prior art charge pump (see FIG. 10) that decreases in voltage by two MOS capacitors $117d_{-1}$ and $117d_{-2}$ connected in series.

In the four-stage Dickson charge pump power supply circuit according to the first embodiment, the voltage (5.13V in the prior art) applied to the final-stage pumping capacitor 17d can be decreased to 4.43V. The capability of current supply can be improved.

In the first embodiment, the diode elements can be replaced with MOS transistors (described in detail later). In this case, too, the same advantages can be obtained.

SECOND EMBODIMENT

Figure 3:
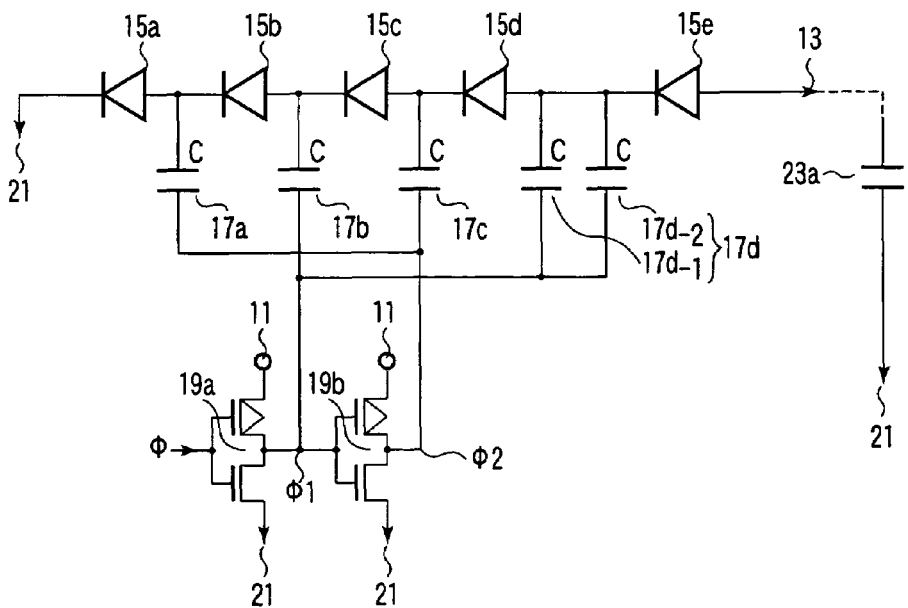
FIG. 3 is a circuit diagram of a negative voltage power supply circuit according to a second embodiment of the present invention.

FIG. 3 shows a basic configuration of a multistage (semiconductor) charge pump according to a second embodiment of the present invention. The second embodiment is directed to a negative voltage power supply circuit as an example of the multistage charge pump. The same elements as those of FIG. 1 are denoted by the same reference numerals and their detailed descriptions are omitted.

The negative voltage power supply circuit of the second embodiment has substantially the same configuration as that of the Dickson charge pump power supply circuit shown in FIG. 1, except for the direction in which first to fifth diode elements 15a to 15e are connected to each other. A lowpotential power supply (hereinafter referred to as a ground) 21 of the first power supply voltage is connected to the cathode terminal (second terminal) of the first diode element 15a in the odd-numbered stage. The anode terminal (first terminal) of the first diode element 15a is connected to the cathode terminal of the second diode element 15b in the even-numbered stage. The anode terminal of the second diode element 15b is connected to the cathode terminal of the third diode element 15c in the odd-numbered stage. The anode terminal of the third diode element 15c is connected to the cathode terminal of the fourth diode element 15d in the even-numbered stage. The anode terminal of the fourth diode terminal 15d is connected to the cathode terminal of the fifth (final-stage) diode element 15e in the odd-numbered stage. The anode terminal of the fifth diode element 15e is connected to an output power supply (terminal) 13. The output power supply 13 is connected to the ground 21 through a load capacitor 23a.

One electrode of a first pumping capacitor (at least one pumping capacitor) 17a is connected to the anode terminal of the first diode element 15a and the cathode terminal of the second diode element 15b. One electrode of a second pumping capacitor (at least one pumping capacitor) 17b is connected to the anode terminal of the second diode element 15b and the cathode terminal of the third diode element 15c. One electrode of a third pumping capacitor (at least one pumping capacitor) 17c is connected to the anode terminal of the third diode element 15c and the cathode terminal of the fourth diode element 15d. One electrode of a fourth (final-stage) pumping capacitor (at least one pumping capacitor) 17d is connected to the anode terminal of the fourth diode element 15d and the cathode terminal of the fifth diode element 15e. The fourth pumping capacitor 17d is configured by two MOS capacitors $17d_{-1}$ and $17d_{-2}$ that are connected in parallel. The size (capacitance c) of each of the MOS capacitors $17d_{-1}$ and $17d_{-2}$ is equal to that of each of the pumping capacitors 17a, 17b and 17c.

In the second embodiment, for example, a negative-voltage power supply circuit that generates a negative voltage (output voltage) of about −3.5V can be configured by setting the potential of the ground 21 at 0V and applying a supply power voltage of 2.5V from a high-potential power supply (hereinafter referred to as an external power supply) 11 of the second power supply voltage.

Since the capacitance of the final-stage pumping capacitor 17d is two (or more) times as large as that of each of the other pumping capacitors 17a to 17c, the highest voltage (greatest electric field) applied to the pumping capacitor 17d is decreased to 5.13V or lower, as in the first embodiment. However, it is when the potential of the first clock signal Φ1 is 2.5V and that of the second clock signal Φ2 is −1.93V that the highest voltage is applied to the pumping capacitor 17d.

The second embodiment can produce almost the same advantages as those of the first embodiment. In the negative-voltage power supply circuit, the voltage (5.13V in the prior art) applied to the final-stage pumping capacitor 17d can be decreased to 4.43V. The capability of current supply can also be improved.

In the second embodiment, too, the diode elements can be replaced with MOS transistors. In this case, the same advantages can be obtained.

THIRD EMBODIMENT

Figure 4:
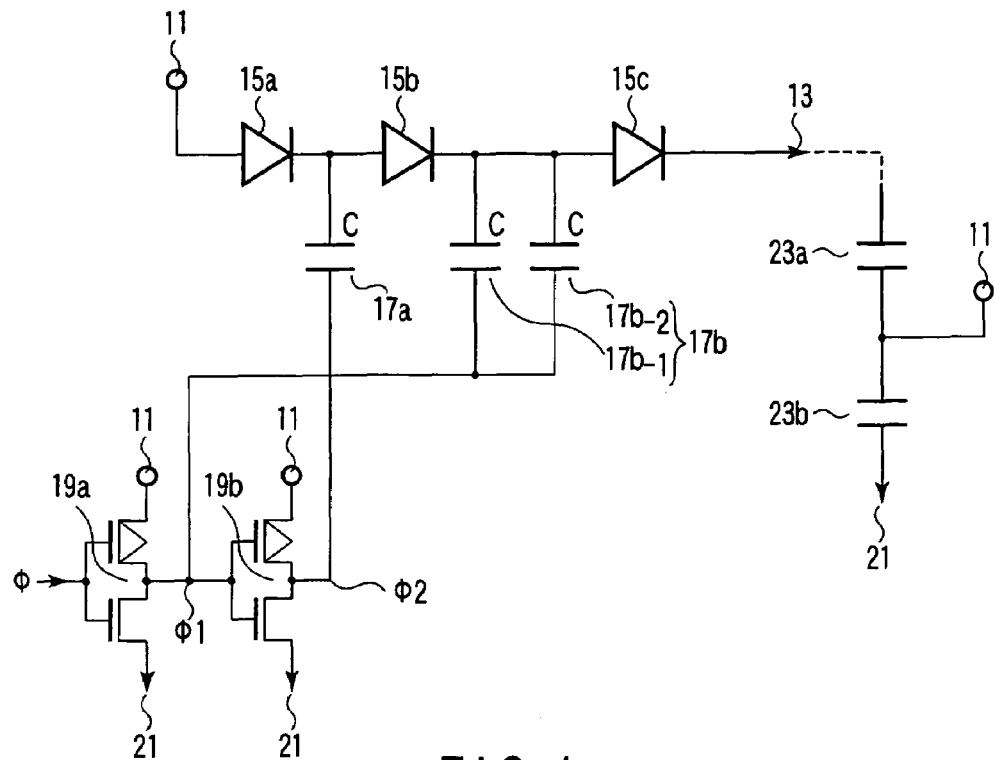
FIG. 4 is a circuit diagram of a boost power supply circuit according to a third embodiment of the present invention, which is configured by a two-stage charge pump.

FIG. 4 shows a basic configuration of a multistage (semiconductor) charge pump according to a third embodiment of the present invention. The third embodiment is directed to a boost power supply circuit that is configured by a two-stage charge pump, as an example of the multistage charge pump. In particular, the boost power supply circuit is configured to generate an output voltage (boost voltage) of about 4.0V, under normal load conditions, upon receiving a first power supply voltage of 0V and a second power supply voltage of 2.5V. The same elements as those of FIG. 1 are denoted by the same reference numerals and their detailed descriptions are omitted.

First to third diode elements 15a to 15c are connected in series between a high-potential power supply (hereinafter referred to as an external power supply) 11 of the second power supply voltage and an output power supply (terminal) 13. The anode terminal (second terminal) of the first diode element 15a in the odd-numbered stage is connected to the external power supply 11. The cathode terminal (first terminal) of the first diode element 15a is connected to the anode terminal of the second diode element 15b in the even-numbered stage. The cathode terminal of the second diode element 15b is connected to the anode terminal of the third (final-stage) diode element 15c in the odd-numbered stage. The cathode terminal of the third diode element 15c is connected to the output power supply 13.

One electrode of a first pumping capacitor (at least one pumping capacitor) 17a is connected to the cathode terminal of the first diode element 15a and the anode terminal of the second diode element 15b. One electrode of a second (final-stage) pumping capacitor (at least one pumping capacitor) 17b is connected to the cathode terminal of the second diode element 15b and the anode terminal of the third diode element 15c.

In the third embodiment, the second pumping capacitor 17b is configured by two MOS capacitors $17b_{-1}$ and $17b_{-2}$ connected in parallel. The size (capacitance c) of each of the MOS capacitors $17b_{-1}$ and $17b_{-2}$ is equal to that of the pumping capacitor 17a. In other words, the second pumping capacitor 17b has twice as large capacitance (2c) as the first pumping capacitor 17a that is formed of a MOS capacitor.

A first clock signal Φ1 is applied to the other electrode of the pumping capacitor 17b, while a second clock signal Φ2 is applied to the other electrode of the pumping capacitor 17a. The first clock signal Φ1 is generated by a CMOS inverter circuit 19a that receives a square clock signal Φ, and the second clock signal Φ2 is generated by a CMOS inverter circuit 19b that receives the first clock signal Φ1.

FIGS. 5A to 5D illustrate operations of the above boost power supply circuit. To describe the operations in simple language, the three diode elements 15a to 15c are compared to lock gates, and the supply power voltage of the external power supply 11, the intermediate nodes of the diode elements 15a to 15c, and the potential (output voltage) of the output power supply 13 are compared to the water levels of lock chambers partitioned by the lock gates.

Figure 5A:
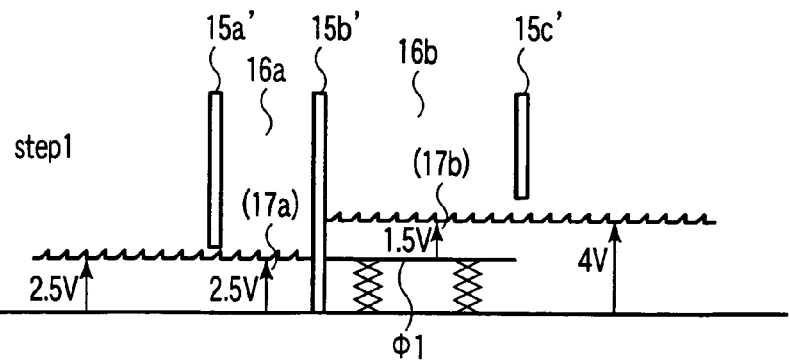
FIGS. 5A to 5D are illustrations of operations of the boost power supply circuit shown in FIG. 4.

FIG. 5A shows step 1 in which a first lock gate 15a' corresponding to the first diode element 15a connected to the external power supply 11 is open. The water level of a first lock chamber 16a partitioned by the first lock gate 15a' and a second lock gate 15b' corresponding to the second diode element 15b becomes equal to the level of the supply power voltage (2.5V) of the external power supply 11. A third lock gate 15c' corresponding to the third (final-stage) diode element 15c connected to the output power supply 13 is also open. The water level of the second lock chamber 16b partitioned by the second lock gate 15b' and the third lock gate 15c' becomes equal to the level of the potential (4.0V) of the output power supply 13.

The water bottom of the second lock chamber 16b is raised. This means that the potential of the first clock signal Φ1 shown in FIG. 4 is 2.5V (the potential of the second clock signal Φ2 is 0V). The heights from the water bottoms of the lock chambers 16a and 16b to the water surfaces thereof correspond to their respective voltages applied to the pumping capacitors 17a and 17b shown in FIG. 4. More specifically, in the operating state of step 1, a voltage of 2.5V, a voltage of 1.28V and a voltage of 1.5V are applied to the first and second pumping capacitors 17a and 17b, respectively.

Figure 5B:
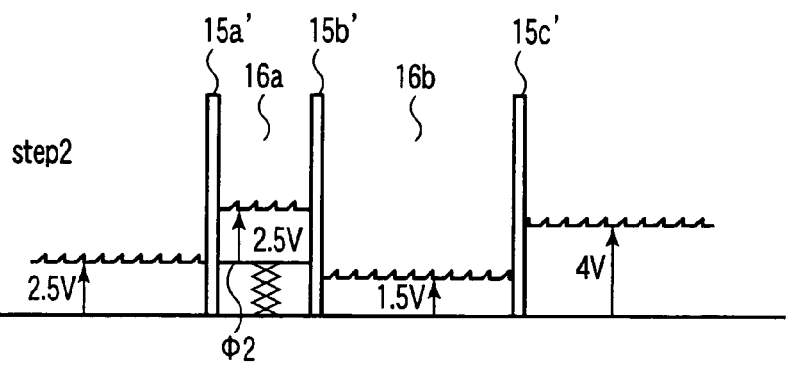

FIG. 5B shows step 2 that indicates the moment when the potential of the first clock signal Φ1 becomes 0V and that of the second clock signal Φ2 becomes 2.5V. For easy understanding, FIG. 5B shows a water level of each of the lock chambers 16a to 16d when all the lock gates 15a' to 15c' corresponding to the three diode elements 15a to 15c are closed and all the lock chambers 16a and 16b are isolated from each other. Since the boost power supply circuit shown in FIG. 4 is configured by the diode elements 15a to 15c of passive elements, the state of step 2 shifts to that of step 3 shortly.

Figure 5C:
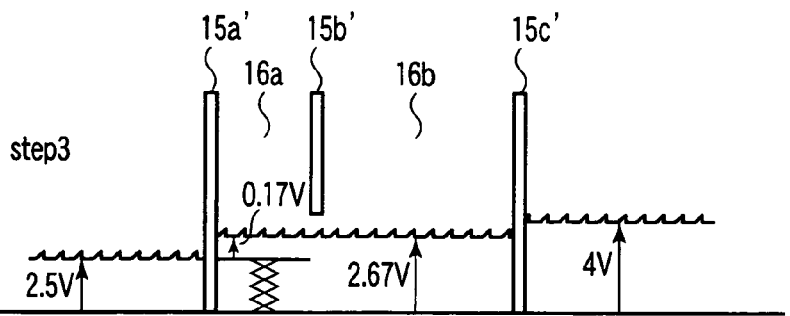

FIG. 5C shows step 3 in which the potentials of the first and second clock signals Φ1 and Φ2 are stabilized after an adequate time elapses after the potential of the first clock signal Φ1 becomes 0V and that of the second clock signal Φ2 becomes 2.5V. The second lock gate 15b' opens, and the water levels of the first and second lock chambers 16a and 16b become equal to each other (2.67V). The highest voltage of 2.67V is applied to the second pumping capacitor 17d.

Figure 5D:
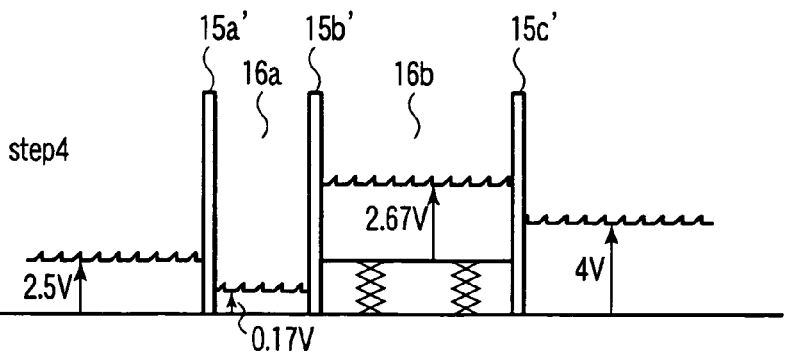

FIG. 5D shows step 4 in which the potential of the first clock signal Φ1 becomes 2.5V and that of the second clock signal Φ2 becomes 0V. These potentials are stabilized again in the state of step 1.

In the third embodiment, the second lock chamber 16d is twice as large as the first lock chamber 16a, or the capacitance of the second pumping capacitor 17b is twice as large as that of the first pumping capacitor 17a, as illustrated in FIGS. 5A to 5D. The water level of the second lock chamber 16b can be lowered to 2.67V from 3.25V, as compared with the case where the second lock chamber 16b is as large as the first lock chamber 16a, or the capacitance of the second pumping capacitor 17b is as large as that of the first pumping capacitor 17a. Consequently, the highest voltage (greatest electric field) applied to the final-stage pumping capacitor 17d can be decreased by 0.58V.

According to the third embodiment, the boost power supply circuit that is configured by a two-stage charge pump allows the voltage applied to the final-stage pumping capacitor 17b to decrease to 2.67V. Further, the capability of current supply can be improved in the same manner as in the first embodiment described above.

The highest voltage applied to the final-stage pumping capacitor 17b can be decreased further if the capacitance of the pumping capacitor 17b is made more than twice as large as that of the other pumping capacitor 17a. It is however appropriate that the capacitance of the pumping capacitor 17b be two to four times as large as that of the other pumping capacitor 17a.

The boost power supply circuit of the third embodiment is configured by a two-stage charge pump. The third embodiment is not limited to this. The boost power supply circuit can be configured by, e.g., a three or more-stage charge pump.

In the third embodiment, too, the diode elements can be replaced with MOS transistors.

FOURTH EMBODIMENT

Figure 6:
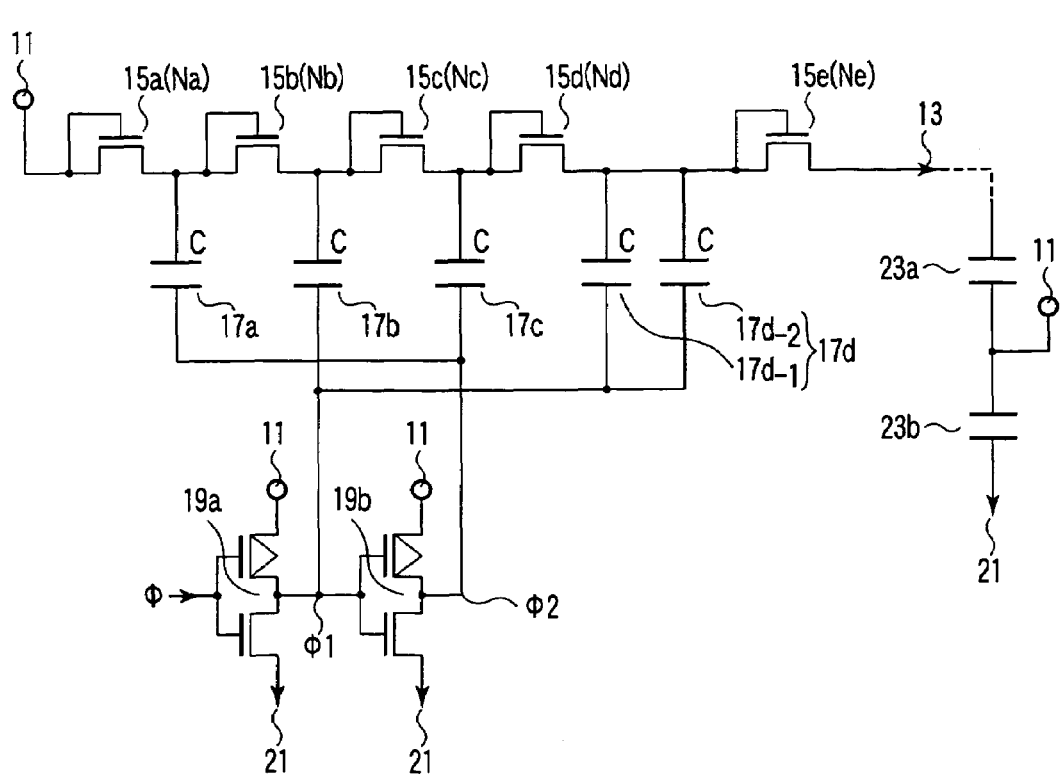
FIG. 6 is a circuit diagram of a Dickson charge pump power supply circuit according to a fourth embodiment of the present invention, which is configured by a diode-connected N-channel MOS transistor.

FIG. 6 shows a basic configuration of a multistage (semiconductor) charge pump according to a fourth embodiment of the present invention. The fourth embodiment is applied to the four-stage Dickson charge pump power supply circuit shown in FIG. 1, the diode elements of which are replaced with diode-connected N-channel MOS transistors. The same elements as those of FIG. 1 are denoted by the same reference numerals and their detailed descriptions are omitted.

Five diode elements 15a to 15e are configured by diode-connected N-channel MOS transistors Na to Ne, respectively. The diode elements 15a to 15e are connected in series between a high-potential power supply (external power supply) 11 of the second power supply voltage and an output power supply (terminal) 13.

In the fourth embodiment, too, the capacitance of the final-stage pumping capacitor 17d is two (or more) times as large as that of each of the other pumping capacitors 17a to 17c. Accordingly, the highest voltage (greatest electric field) applied to the pumping capacitor 17d can be decreased.

FIFTH EMBODIMENT

Figure 7:
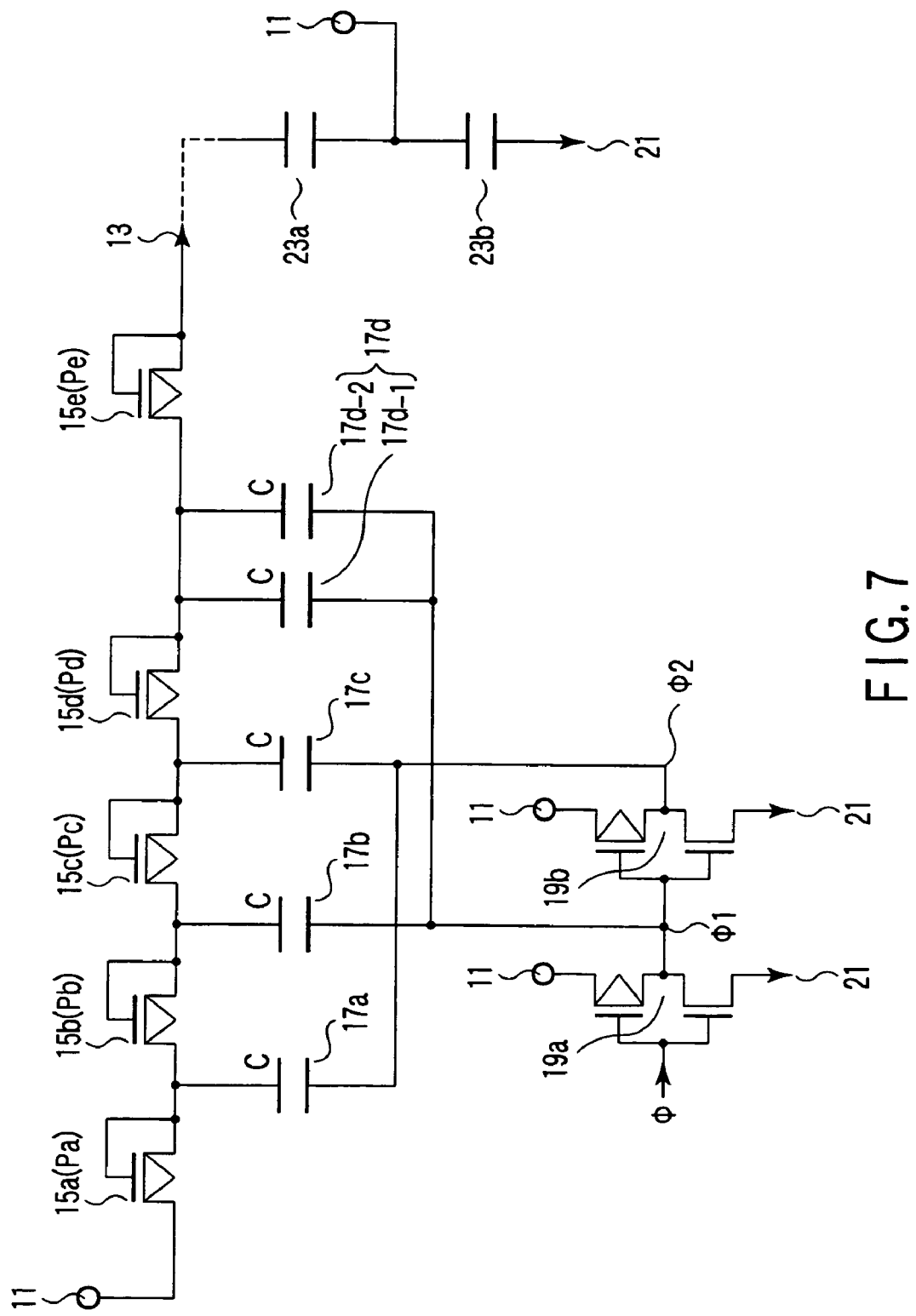
FIG. 7 is a circuit diagram of a Dickson charge pump power supply circuit according to a fifth embodiment of the present invention, which is configured by a diode-connected P-channel MOS transistor.

FIG. 7 shows a basic configuration of a multistage (semiconductor) charge pump according to a fifth embodiment of the present invention. The fifth embodiment is applied to the four-stage Dickson charge pump power supply circuit shown in FIG. 1, the diode elements of which are replaced with diode-connected P-channel MOS transistors. The same elements as those of FIG. 1 are denoted by the same reference numerals and their detailed descriptions are omitted.

Five diode elements 15a to 15e are configured by diode-connected P-channel MOS transistors Pa to Pe, respectively. The diode elements 15a to 15e are connected in series between a high-potential power supply (external power supply) 11 of the second power supply voltage and an output power supply (terminal) 13.

In the fourth embodiment, too, the capacitance of the final-stage pumping capacitor 17d is two (or more) times as large as that of each of the other pumping capacitors 17a to 17c. Accordingly, the highest voltage (greatest electric field) applied to the pumping capacitor 17d can be decreased.

In all of the first to fifth embodiments, the effective capacitance of the final-stage pumping capacitor can be doubled as described above. Consequently, even though the pumping capacitors are configured by MOS capacitors, the greatest electric field applied to the final-stage pumping capacitor can be decreased to prevent a gate oxide film from being broken.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising a three or more-stage semiconductor charge pump, wherein capacitance of a pumping capacitor that increases the absolute value of a potential of a final-stage node on an output side is larger than that of a pumping capacitor that increases the absolute value of a potential of another-stage node, wherein the pumping capacitor that increases the absolute value of the potential of the final-stage node includes two capacitors connected in parallel, and the capacitance thereof is two or more times as large as that of the pumping capacitor that increases the absolute value of the potential of said another-stage node.

2. The semiconductor device according to claim 1, wherein the three or more-stage semiconductor charge pump includes:

a plurality of diode elements connected in series;

an output circuit which outputs a first clock signal and a second clock signal whose phases are 180° shifted from each other;

at least one first pumping capacitor one electrode of which is supplied with the second clock signal and other electrode of which is connected to a node between a first terminal of a diode element in an odd-numbered stage and a second terminal of a diode element in an even-numbered stage; and at least one second pumping capacitor one electrode of which is supplied with the first clock signal and other electrode of which is connected to a node between a first terminal of a diode element in an even-numbered stage and a second terminal of a diode element in an odd-numbered stage.

3. The semiconductor device according to claim 2, wherein the diode elements are configured by diode-connected N-channel metal oxide semiconductor (MOS) transistors.

4. The semiconductor device according to claim 2, wherein the diode elements are configured by diode-connected P-channel metal oxide semiconductor (MOS) transistors.

5. The semiconductor device according to claim 2, wherein the first and second pumping capacitors are configured by metal oxide semiconductor (MOS) capacitors.

6. The semiconductor device according to claim 1, which is a Dickson charge pump power supply circuit.

7. The semiconductor device according to claim 6, wherein the Dickson charge pump power supply circuit includes:
   at least first to fifth diode elements connected in series;
   first and second output circuits which output respective first and second clock signals whose phases are 180° shifted from each other;
   a first pumping capacitor one electrode of which is supplied with the second clock signal and other electrode of which is connected to a node between a cathode terminal of the first diode element and an anode terminal of the second diode element;
   a second pumping capacitor one electrode of which is supplied with the first clock signal and other electrode of which is connected to a node between a cathode terminal of the second diode element and an anode terminal of the third diode element;
   a third pumping capacitor one electrode of which is supplied with the second clock signal and other electrode of which is connected to a node between a cathode terminal of the third diode element and an anode terminal of the fourth diode element; and
   a fourth pumping capacitor one electrode of which is supplied with the first clock signal and other electrode of which is connected to a node between an anode terminal of the fourth diode element and a cathode terminal of the fifth diode element, the fourth pumping capacitor having capacitance that is two or more times as large as that of each of the first to third pumping capacitors,
   wherein the fourth pumping capacitor includes two capacitors connected in parallel.

8. The semiconductor device according to claim 7, wherein the first clock signal has a square waveform corresponding to a first power supply potential, and a second clock signal has a square waveform corresponding to a second power supply potential that is higher than the first power supply potential.

9. The semiconductor device according to claim 7, further comprising first and second load capacitors which are connected in series to an output power supply terminal to which a cathode terminal of the fifth diode element is connected.

10. The semiconductor device according to claim 1, which is a negative-voltage power supply circuit.

11. The semiconductor device according to claim 10, wherein the negative-voltage power supply circuit includes:
    at least first to fifth diode elements connected in series;
    first and second output circuits which output respective first and second clock signals whose phases are 180° shifted from each other;
    a first pumping capacitor one electrode of which is supplied with the second clock signal and other electrode of which is connected to a node between a cathode terminal of the first diode element and an anode terminal of the second diode element;
    a second pumping capacitor one electrode of which is supplied with the first clock signal and other electrode of which is connected to a node between a cathode terminal of the second diode element and an anode terminal of the third diode element;
    a third pumping capacitor one electrode of which is supplied with the second clock signal and other electrode of which is connected to a node between a cathode terminal of the third diode element and an anode terminal of the fourth diode element; and
    a fourth pumping capacitor one electrode of which is supplied with the first clock signal and other electrode of which is connected to a node between a cathode terminal of the fourth diode element and an anode terminal of the fifth diode element, the fourth pumping capacitor having capacitance that is two or more times as large as that of each of the first to third pumping capacitors,
    wherein the fourth pumping capacitor includes two capacitors connected in parallel.

12. The semiconductor device according to claim 11, wherein the first clock signal has a square waveform corresponding to a first power supply potential, and a second clock signal has a square waveform corresponding to a second power supply potential that is higher than the first power supply potential.

13. The semiconductor device according to claim 11, further comprising a first load capacitor which is connected in series to an output power supply terminal to which an anode terminal of the fifth diode element is connected.

14. The semiconductor device according to claim 1, which is a boost power supply circuit.

15. The semiconductor device according to claim 14, wherein the boost power supply circuit includes:
    at least first to third diode elements connected in series;
    first and second output circuits which output respective first and second clock signals whose phases are 180° shifted from each other;
    a first pumping capacitor one electrode of which is supplied with the second clock signal and other electrode of which is connected to a node between a cathode terminal of the first diode element and an anode terminal of the second diode element; and
    a second pumping capacitor one electrode of which is supplied with the first clock signal and other electrode of which is connected to a node between a cathode terminal of the second diode element and an anode terminal of the third diode element, the second pumping capacitor having capacitance that is two or more times as large as that of the first pumping capacitor,
    wherein the second pumping capacitor includes two capacitors connected in parallel.

16. The semiconductor device according to claim 15, wherein the first clock signal has a square waveform corresponding to a first power supply potential, and a second clock signal has a square waveform corresponding to a second power supply potential that is higher than the first power supply potential.

17. The semiconductor device according to claim 15, further comprising first and second load capacitors which are connected in series to an output power supply terminal to which a cathode terminal of the third diode element is connected.

* * * * *